(12) United States Patent
Nakajima et al.

(10) Patent No.: US 7,421,594 B2
(45) Date of Patent: Sep. 2, 2008

(54) BUS POWER DEVICE AND POWER-SOURCE CONTROL METHOD

(75) Inventors: Kenji Nakajima, Kawasaki (JP); Kazuhide Ooba, Kawasaki (JP); Masamichi Suzuki, Higashine (JP)

(73) Assignee: Fujitsu Limited, Kawasaki (JP)

( * ) Notice: Subject to any disclaimer, the term of this patent is extended or adjusted under 35 U.S.C. 154(b) by 394 days.

(21) Appl. No.: 11/023,298

(22) Filed: Dec. 27, 2004

(65) Prior Publication Data

US 2005/0144495 A1 Jun. 30, 2005

Related U.S. Application Data

(63) Continuation of application No. PCT/JP03/03836, filed on Mar. 27, 2003.

(30) Foreign Application Priority Data

Aug. 21, 2002 (JP) .............................. 2002-240477

(51) Int. Cl.
*G06F 1/00* (2006.01)
(52) U.S. Cl. ...................... 713/300; 713/340; 320/141
(58) Field of Classification Search ................ 713/300, 713/340; 320/141
See application file for complete search history.

(56) References Cited

U.S. PATENT DOCUMENTS

| | | | |
|---|---|---|---|
| 5,802,379 A | | 9/1998 | Boatwright et al. |
| 6,118,254 A * | | 9/2000 | Faulk .......................... 320/141 |
| 6,357,011 B2 * | | 3/2002 | Gilbert ........................ 713/300 |
| 6,384,570 B2 * | | 5/2002 | Matsuyama .................. 320/101 |
| 6,618,786 B1 * | | 9/2003 | Sidiropoulos et al. ........ 710/305 |
| 6,690,199 B2 * | | 2/2004 | Ajit .............................. 326/87 |
| 6,715,071 B2 | | 3/2004 | Ono et al. |
| 6,928,568 B2 * | | 8/2005 | Breen et al. .................. 713/340 |
| 7,024,569 B1 * | | 4/2006 | Wright et al. ................ 713/300 |
| 2002/0076038 A1 * | | 6/2002 | Barrese et al. ............... 379/413 |
| 2003/0110403 A1 * | | 6/2003 | Crutchfield et al. ......... 713/300 |

FOREIGN PATENT DOCUMENTS

| | | |
|---|---|---|
| EP | 0 717 341 | 6/1996 |
| EP | 0 964 360 | 12/1999 |
| JP | 04-091630 | 3/1992 |
| JP | 10-325846 | 12/1998 |
| JP | 2000-029544 | 1/2000 |
| JP | 2000-217354 | 8/2000 |
| JP | 2002-049444 | 3/2002 |
| JP | 2002-91629 | 3/2002 |
| JP | 2003-219561 | 7/2003 |

* cited by examiner

*Primary Examiner*—Thomas Lee
*Assistant Examiner*—Vincent T Tran
(74) *Attorney, Agent, or Firm*—Greer, Burns & Crain, Ltd.

(57) ABSTRACT

A bus power device includes a connector that is connected to a port of a host apparatus compliant with a predetermined interface standard; a current/voltage detecting unit that detects a current/voltage supplied from the host apparatus to a bus power line via the port and the connector; and a power assisting unit that assists a current to the bus power line based on a result of comparison between the current detected by the current/voltage detecting unit and a threshold current, and assists a voltage to the bus power line by an amount of shortfalls in the voltage based on a result of comparison between the voltage detected by the current/voltage detecting unit and a threshold voltage.

18 Claims, 11 Drawing Sheets

BUS POWER DEVICE AND POWER-SOURCE CONTROL METHOD

This is a continuation of International PCT Application No. PCT/JP03/03836 filed Mar. 27, 2003.

BACKGROUND OF THE INVENTION

1) Field of the Invention

The present invention relates to a bus power device based on an interface standard of universal serial bus (USB), Institute of Electrical and Electronics Engineers (IEEE) 1394, and the like. More particularly, the present invention relates to a bus power device and a power-source control method that can avoid an inoperative state due to a voltage drop or the like, figure out a battery remaining level according to an operation status, and charge the battery quickly.

2) Description of the Related Art

Recently, as an interface to connect a peripheral device to a personal computer, the USB interface standard attracts attention. The USB interface standard has a characteristic that the interface can connect maximum of 127 USB devices in a tree structure.

FIG. 7 is a block diagram of a configuration of a conventional bus power device 20. In this drawing, a USB-corresponding device 10 is a personal computer corresponding to the USB interface standard, and has a high-power USB port 11. A hub 13 has a low-power USB port 12 that is driven with bus power.

The high-power USB port 11 is connected with a USB connector (i.e., a USB connector 30 in the drawing) and can supply high power. The high-power USB port 11 has a basic function as a data input/output port, and a function of supplying rated power of 2.5 watts (500 mA/5 V) to the USB device (i.e., the bus power device 20 in the drawing).

The low-power USB port 12 is a low-power port connected with the USB connector, and has a function as a data input/output port, and a function of supplying rated power of 0.5 watt (100 mA/5 V) to the USB device. However, the USB device connected to the low-power USB port 12 is not driven with low power of 0.5 watt, but is a self-power unit that is driven with power received from a separate power source.

The bus power device 20 is a hard disk drive unit as one USB device, and is driven with high power (2.5 watts (500 mA/5 V)) supplied from the USB-corresponding device 10 via the USB connector 30 connected to the high-power USB port 11.

The USB connector 30 is based on the USB interface standard, and is connected to the high-power USB port 11 when the bus power device 20 is used. The USB connector 30 is also connected to a bus power line 31 to supply power to each section, a data line 32, a ground (GND) line, a shield line, and the like.

A USB/AT attachment (USB/ATA) converter 21 has a function of converting data of the USB interface standard input through a data line 32 into data of an ATA interface standard, and outputting the converted data to a hard disk 23 via an ATA interface 22.

The hard disk 23 is a large-capacity recording medium which is rotatably driven with power supplied through the bus power line 31 to read/write data.

The USB/ATA converter 21 has a function of converting the data of the ATA interface standard read from the hard disk 23 and input via the ATA interface 22, into data of the USB interface standard, and outputting the converted data to the data line 32.

A voltage adjustor 24 adjusts a voltage of 5 V supplied through the bus power line 31 into a voltage of 3.3 V, and supplies this voltage to the USB/ATA converter 21.

The operation by the bus power device 20 is explained with reference to a flowchart shown in FIG. 8. At step SA1 in the drawing, the USB connector 30 is connected to the high-power USB port 11, and is plugged in. At step SA2, the USB-corresponding device 10 acknowledges the bus power device 20.

At step SA3, it is determined whether the USB connector 30 is connected to the high-power USB port 11. In this case, the determination result is "Yes". At step SA4, the USB-corresponding device 10 supplies the high power (500 mA/5 V) to the voltage adjustor 24 and the hard disk 23 through the bus power line 31.

As a result, at step SA5, the voltage adjustor 24 supplies the voltage of 3.3 V to the USB/ATA converter 21, so that the USB/ATA converter 21 starts operation and the hard disk 23 also starts operation.

On the other hand, when the determination result at step SA3 is "No", that is, when the USB connector 30 is connected to the low-power USB port 12, the USB-corresponding device 10 supplies only the low power (100 mA/5 V) to each section of the bus power device 20. Therefore, at step SA6, the bus power device 20 is unusable.

According to the bus power device 20 shown in FIG. 7, depending on the operation condition, immediately after the USB connector 30 is connected to the USB-corresponding device 10, an inrush current flows through the bus power line 31 at the initial rotation of the hard disk 23. This has a problem in that the current supplied from the USB-corresponding device 10 to the bus power device 20 may exceed a predetermined value (500 mA), leading to a malfunction or an operation failure.

To solve this problem, the conventional bus power device employs a current assisting system by having a secondary battery. When the current that flows through the bus power line 31 exceeds a predetermined value, the secondary battery countervails an overcurrent, or assists to decrease the current that is supplied from the high-power USB port 11 to the bus power device 20.

FIG. 9 is a block diagram of a configuration of a conventional bus power device 40 according to the current assisting system. In the drawing, like reference numerals as those in FIG. 7 designate like parts, and their explanation is omitted.

In the bus power device 40 in the drawing, a secondary battery 41 is a lithium ion battery, an alkali battery, a nickel cadmium battery, or the like that can be repetitively charged and discharged. When the current flowing through the bus power line 31 exceeds a predetermined value, the secondary battery 41 supplies an overcurrent to each section through the bus power line 31.

A current detector 42 detects a current that flows through the bus power line 31. An micro processing unit (MPU) 43 has a function of controlling the current assist based on the result of the current detection by the current detector 42, a function of controlling a charge to the secondary battery 41, a function of controlling a power supply to the hard disk 23, a function of controlling a display of a battery remaining level, a function of monitoring a status of the USB/ATA converter 21, and the like.

A hard disk power source switch 44 is present between the bus power line 31 and the hard disk 23, and has a function of turning on/off a power supply to the hard disk 23 under the control of the MPU 43. A charger 45 is present between the bus power line 31 and the secondary battery 41, and has a function of charging a current flowing through the bus power line 31 to the secondary battery 41 under the control of the MPU 43.

A current assisting unit 46 is present between the secondary battery 41 and the bus power line 31, and has a current assisting function of supplying an overcurrent from the secondary battery 41 to the bus power line 31 under the control of the MPU 43 when a current exceeding a predetermined value flows to the bus power line 31.

A battery remaining level display unit 47 displays a battery remaining level of the secondary battery 41 by lighting/flickering a light emitting diode (LED) under the control of the MPU 43. Specifically, when the battery voltage of the secondary battery 41 exceeds a threshold value, the LED lights up to inform a user that the battery remaining level is sufficient. On the other hand, when the battery voltage of the secondary battery 41 becomes equal to or lower than the threshold value, the LED flickers to inform the user that there is only small room in the battery remaining level.

In the above configuration, when the USB connector 30 is connected to the high-power USB port 11 and is plugged in, the USB-corresponding device 10 acknowledges the bus power device 40.

As a result, the USB-corresponding device 10 supplies the high power (500 mA/5 V) to each section through the bus power line 31 to activate each section. Specifically, the voltage adjustor 24 supplies a voltage of 3.3 V to the USB/ATA converter 21, so that the USB/ATA converter 21 starts operation. When the hard disk power source switch 44 is turned on under the control of the MPU 43, the bus power line 31 supplies power to the hard disk 23, so that the hard disk 23 starts operation.

When an inrush current flows through the bus power line 31 due to the initial rotation of the hard disk 23 and when this current exceeds a predetermined value, a current assist is carried out. In other words, when the current detected by the current detector 42 exceeds the predetermined value, the MPU 43 instructs the current assisting unit 46 to assist the current.

As a result, the current assisting unit 46 discharges the secondary battery 41, and supplies the current from the secondary battery 41 to the bus power line 31. Accordingly, the current detector 42 detects that the current becomes equal to or smaller than the predetermined value, because the current is smaller by the current discharged from the secondary battery 41.

When the current detected by the current detector 42 is equal to or smaller than the predetermined value, the current assisting unit 46 does not need to assist the current, and therefore, the MPU 43 outputs a charge pulse to the charger 45.

Therefore, the charger 45 supplies a part of the current from the bus power line 31 to the secondary battery 41 to charge the secondary battery 41. The MPU 43 makes the battery remaining level display unit 47 display a battery remaining level of the secondary battery 41 based on a result of monitoring the battery voltage.

When the USB connector 30 is connected to the low-power USB port 12, the USB-corresponding device 10 supplies only the low power (100 mA/5 V) to each section of the bus power device 40. Therefore, the bus power device 40 is unusable.

FIG. 10 is a block diagram of a configuration of a conventional bus power device 50. In the drawing, like reference numerals as those in FIG. 9 designate like parts, and their explanation is omitted. When the USB connector 30 is connected to the low-power USB port 12, the bus power device 50 in the drawing receives high power from a separate power source and is driven.

The bus power device 50 additionally has a direct current (DC) jack 51 and a switcher 52. The DC jack 51 is a terminal that connects an alternating current/direct current (AC/DC) adaptor (not shown) as a separate power source. The DC jack 51 is connected to the bus power line 31 via the switcher 52.

The AC/DC adaptor converts an alternating current to a direct current, and generates a DC voltage/current. The switcher 52 has a function of switching the connection destination of the bus power line 31 to the USB connector 30 or the DC jack 51.

The operation by the bus power device 50 is explained with reference to a flowchart shown in FIG. 11. In the above configuration, when the AC/DC adaptor (not shown) is connected to the DC jack 51 in a state that the switcher 52 switches over to the DC jack 51, at step SB1 shown in FIG. 11, the AC/DC adaptor supplies the high power (500 mA/5 V) to each section via the DC jack 51, the switcher 52, and the bus power line 31, so that each section is activated.

Specifically, the voltage adjustor 24 supplies a voltage of 3.3 V to the USB/ATA converter 21, so that the USB/ATA converter starts operation. When the hard disk power source switch 44 is turned on under the control of the MPU 43, the bus power line 31 supplies power to the hard disk 23, so that the hard disk 23 is powered on.

When the USB connector 30 is connected to the low-power USB port 12 and is plugged in at step SB2, the USB-corresponding device 10 acknowledges the bus power device 50 at step SB3. At step SB4, the bus power device 50 starts the operation.

As described above, in the bus power device 40 shown in FIG. 9, the current detector 42 detects a current that flows through the bus power line 31. When the current exceeds a predetermined value, the secondary battery 41 assists the current according to the current assisting system.

In FIG. 9, when a connector contact resistance from the high-power USB port 11 to a unit to be driven (such as the hard disk 23) is large or when a cable is long, a large voltage drop occurs.

For example, assume that the high-power USB port 11 has a voltage of 5 V, and the operation guarantee voltage of the hard disk 23 is 4.75 to 5.25 V. In this case, when the voltage drops in excess of 0.25 V, a voltage supplied to the hard disk 23 becomes less than the operation guarantee voltage of 4.75 (5−0.25) V. As a result, the hard disk 23 does not operate.

However, according to the current assisting system in the bus power device 40, only the current that flows through the bus power line 31 is detected. Therefore, the inoperative state due to the voltage drop cannot be avoided.

According to the conventional bus power device 40, the load (the battery voltage) of the secondary battery 41 changes depending on the operation status (charging, access to the hard disk 23, or data transfer) of the bus power device 40. Despite this change, the bus power device 40 compares the battery voltage of the secondary battery 41 with one threshold value, and makes the battery remaining level display unit 47 display the battery remaining level based on a result of this comparison. Therefore, an accurate battery remaining level cannot be understood.

According to the conventional bus power device 40, the charger 45 charges a constant current to the secondary battery 41. Therefore, even when it is necessary to charge in a short time, a quick charging cannot be achieved.

When the conventional bus power device 50 shown in FIG. 10 is connected to the low-power USB port 12, a separate power source (the AC/DC adapter) is essential. Therefore, the bus power device 50 cannot be used without the separate power source.

SUMMARY OF THE INVENTION

It is an object of the present invention to solve at least the above problems in the conventional technology.

A bus power device according to one aspect of the present invention includes a connector that is connected to a port of a host apparatus compliant with a predetermined interface standard; a current/voltage detecting unit that detects a current/voltage supplied from the host apparatus to a bus power line via the port and the connector; and a power assisting unit that assists a current to the bus power line based on a result of comparison between the current detected by the current/voltage detecting unit and a threshold current, and assists a voltage to the bus power line by an amount of shortfalls in the voltage based on a result of comparison between the voltage detected by the current/voltage detecting unit and a threshold voltage.

A power-source control method according to another aspect of the present invention, which is for a bus power device having a connector that is connected to a port of a host apparatus compliant with a predetermined interface standard, includes detecting a current/voltage supplied from the host apparatus to a bus power line via the port and the connector; and a power assisting including assisting a current to the bus power line based on a result of comparison between the current detected by the current/voltage detecting unit and a threshold current, and assisting a voltage to the bus power line based on a result of comparison between the voltage detected by the current/voltage detecting unit and a threshold voltage.

The other objects, features, and advantages of the present invention are specifically set forth in or will become apparent from the following detailed description of the invention when read in conjunction with the accompanying drawings.

DETAILED DESCRIPTION

Exemplary embodiments of a bus power device and a power-source control method according to the present invention will be explained in detail with reference to the accompanying drawings.

Figure 1:
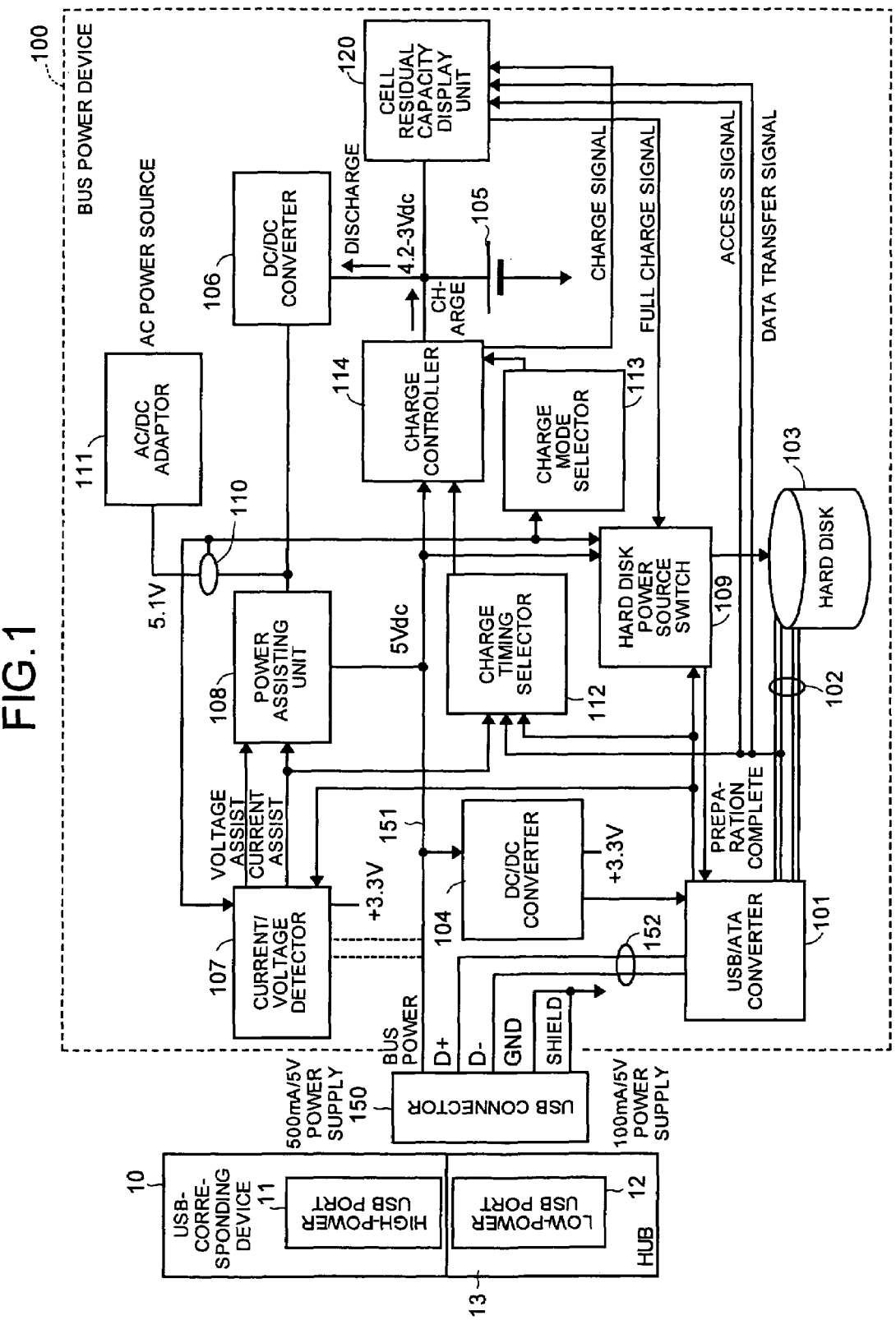
FIG. 1 is a block diagram of a configuration of a bus power device according to a first embodiment of the present invention.
Figure 9:
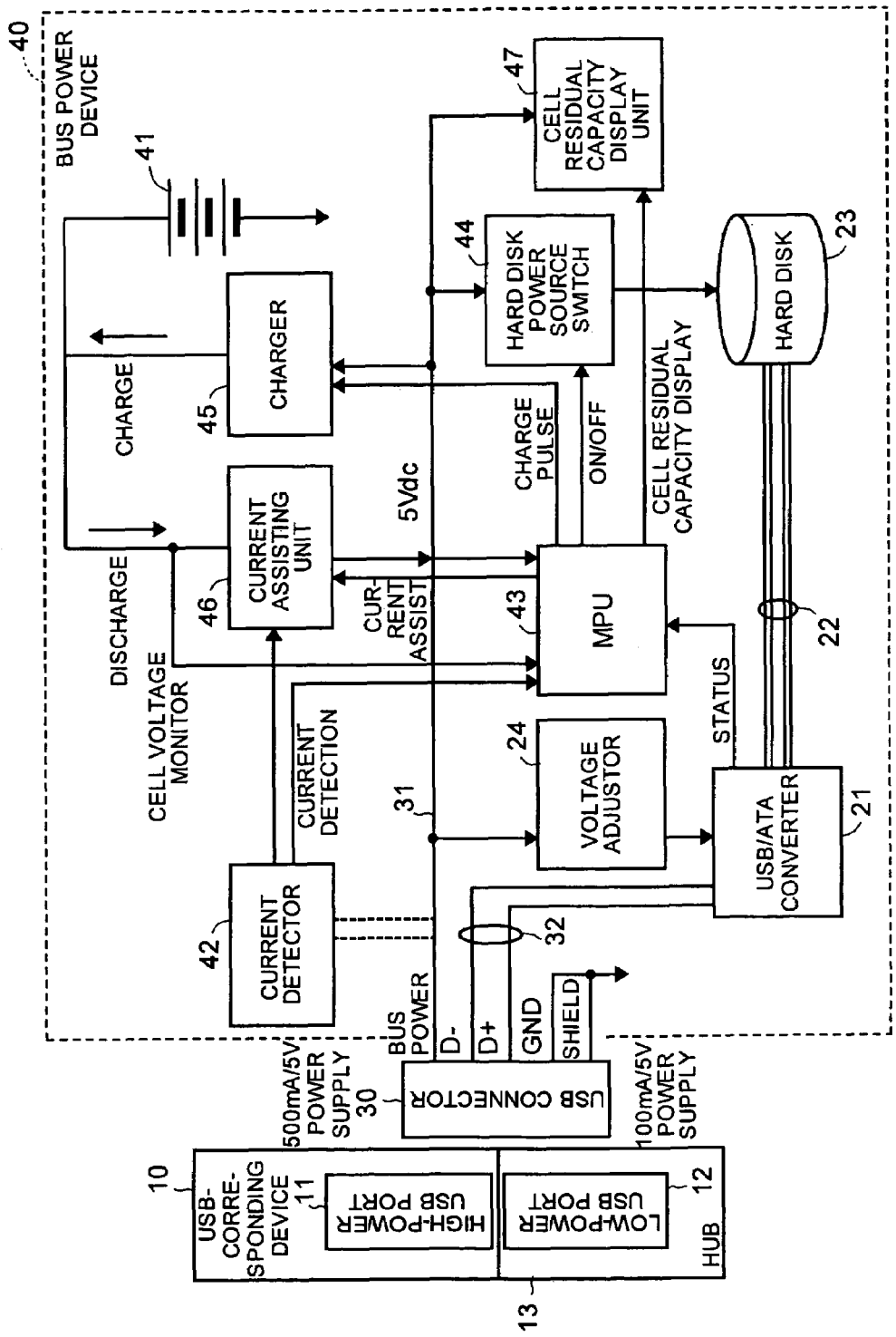
FIG. 9 is a block diagram of a configuration of a conventional bus power device 40.
Figure 10:
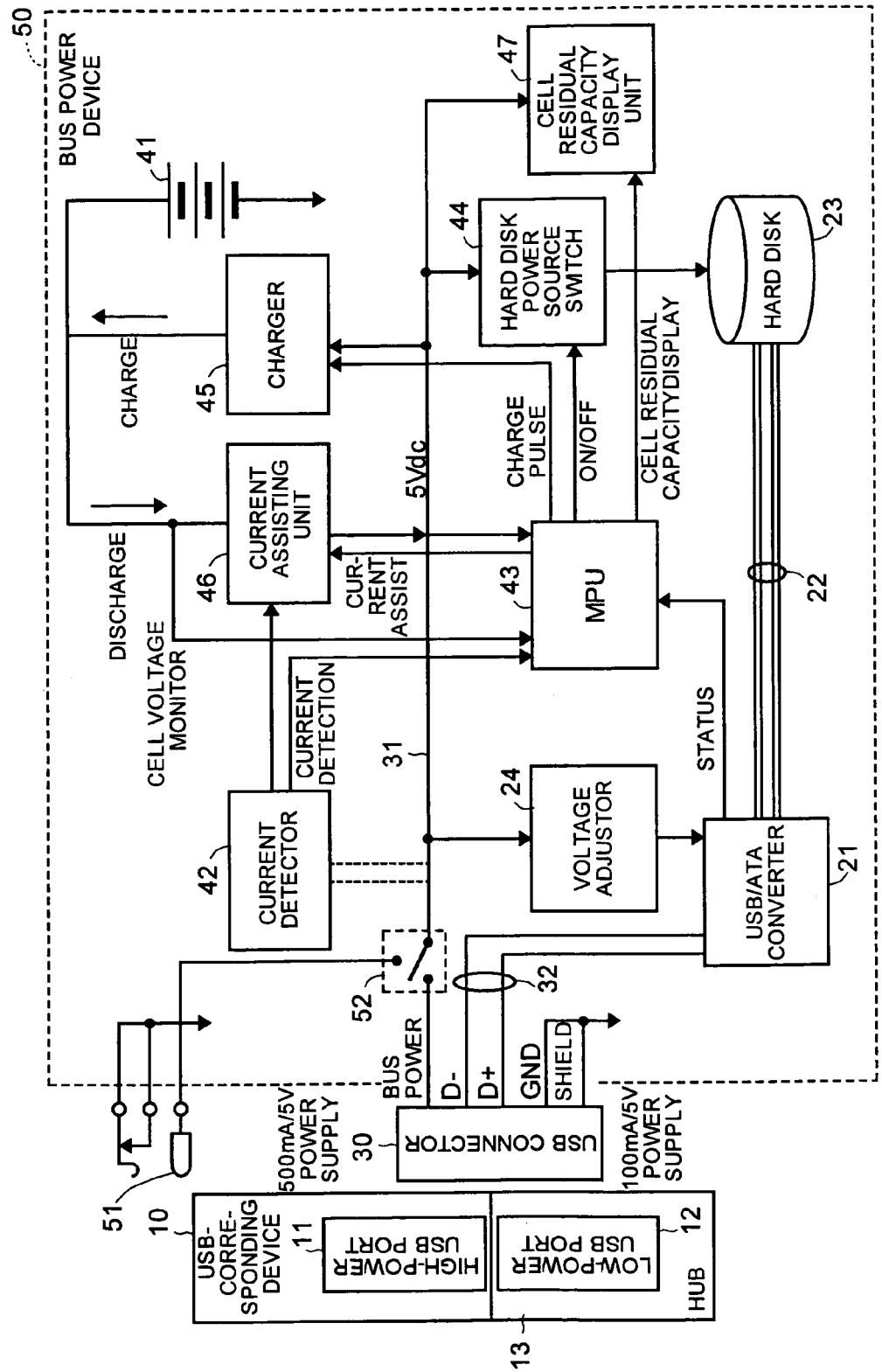
FIG. 10 is a block diagram of a configuration of a conventional bus power device 50.
Figure 11:
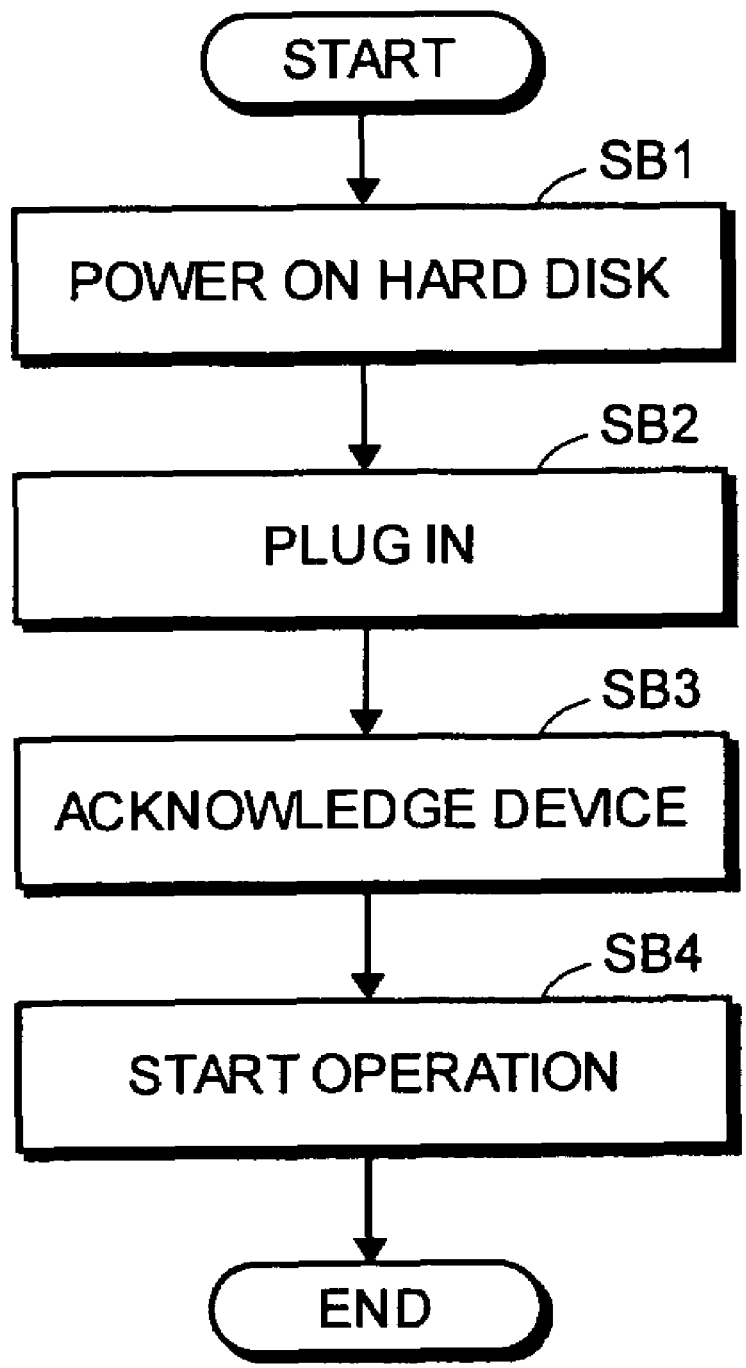
FIG. 11 is a flowchart for explaining the operation by the bus power device 50 shown in FIG. 10.

FIG. 1 is a block diagram of a configuration of a bus power device according to a first embodiment of the present invention. In the drawing, like reference numerals as those in FIG. 9 designate like parts, and their explanation is omitted. In the drawing, a bus power device 100 is provided in place of the bus power device 40 shown in FIG. 9.

The bus power device 100 is a hard disk drive unit as one USB device, and is driven with high power (2.5 watts (500 mA/5 V)) supplied from the USB-corresponding device 10 via a USB connector 150 connected to the high-power USB port 11 or supplied from an AC/DC adaptor 111 described later.

The USB connector 150 is based on the USB interface standard, and is connected to the high-power USB port 11 during a normal use of the bus power device 100. When the USB connector 150 is connected to the low-power USB port 12, and even when the AC/DC adaptor 111 is not present, the bus power device 100 can operate using a secondary battery 105.

The USB connector 150 is connected to a bus power line 151 to supply power to each section, a data line 152, a GND line, a shield line, and the like.

A USB/ATA converter 101 has a function of converting data of the USB interface standard input through the data line 152 into data of the ATA interface standard, and outputting the converted data to a hard disk 103 via an ATA interface 102.

The hard disk 103 is a large-capacity recording medium which is rotatably driven with power supplied through the bus power line 151 to read/write data.

The USB/ATA converter 101 has a function of converting the data of the ATA interface standard read from the hard disk 103 and input via the ATA interface 102, into data of the USB interface standard, and outputting the converted data to the data line 152.

A DC/DC converter 104 converts a voltage of 5 V supplied from the bus power line 151 into a voltage of 3.3 V, and supplies this voltage of 3.3 V to the USB/ATA converter 101.

The secondary battery 105 is a lithium ion battery, an alkali battery, a nickel cadmium battery, or the like that can be repetitively charged and discharged. When a current that flows through the bus power line 151 exceeds a predetermined value, the secondary battery 105 supplies an overcurrent to each section. When a voltage of the bus power line 151 is equal to or smaller than a predetermined value, the secondary battery 105 supplies a voltage as much as the deficient amount to the bus power line 151.

When the USB connector 150 is connected to the low-power USB port 12 and also when the AC/DC adaptor 111 explained later is not connected, the secondary battery 105 functions as a main power source, and supplies power to each section. A battery voltage (a rated value) of the secondary battery 105 is 4.2 to 3 V. The DC/DC converter 106 has a function of raising the battery voltage of the secondary battery 105 to 5 V.

A current/voltage detector 107 detects a current that flows through the bus power line 151, and detects a voltage of the bus power line 151. When the current/voltage detector 107 detects that the current exceeds a threshold current (for example, 100 mA or 500 mA), the current/voltage detector 107 makes a power assisting unit 108 supply an overcurrent from the secondary battery 105 (the AC/DC adaptor 111 explained later) to the bus power line 151.

When the current/voltage detector 107 detects that the voltage is less than a threshold voltage (for example, 4.75 V), the current/voltage detector 107 makes the power assisting unit 108 supply a voltage from the DC/DC converter 106 (the secondary battery 105) or the AC/DC adaptor 111 to the bus power line 151, thereby raising the voltage of the bus power line 151.

The power assisting unit 108 has a function of assisting power based on both the current assist and the voltage assist.

A hard disk power source switch 109 is present between the bus power line 151 and the hard disk 103, and has a function of turning on/off a power supply to the hard disk 103. A DC jack 110 is a terminal that connects the AC/DC adaptor 111 as a separate power source. The DC jack 110 is connected to the power assisting unit 108 or the like.

The AC/DC adaptor 111 converts an alternating current to a direct current, and generates a DC voltage/current. A charge timing selector 112 has a function of selecting a timing of charging the secondary battery 105.

A charge mode selector 113 selects a rapid charge mode when the AC/DC adaptor 111 is connected to the DC jack 110, and selects a normal charge mode when the AC/DC adaptor 111 is not connected to the DC jack 110. In the rapid charge mode, a charge current is larger than that in the normal charge mode, and therefore, a charge time from a start of charging till the charge becomes full can be shortened, thereby making it possible to charge rapidly.

A charge controller 114 controls charging to the secondary battery 105 based on a charge timing from the charge timing selector 112 and a charge mode from the charge mode selector 113. The charge controller 114 has the normal charge mode of charging a first charge current, and the rapid charge mode of rapidly charging a second charge current (>the first charge current).

The battery remaining level display unit 120 changes a threshold voltage at three stages according to the operation status of the bus power device 100, and displays a battery remaining level based on a result of comparison between the threshold voltage and the battery voltage of the secondary battery 105.

Figure 2:
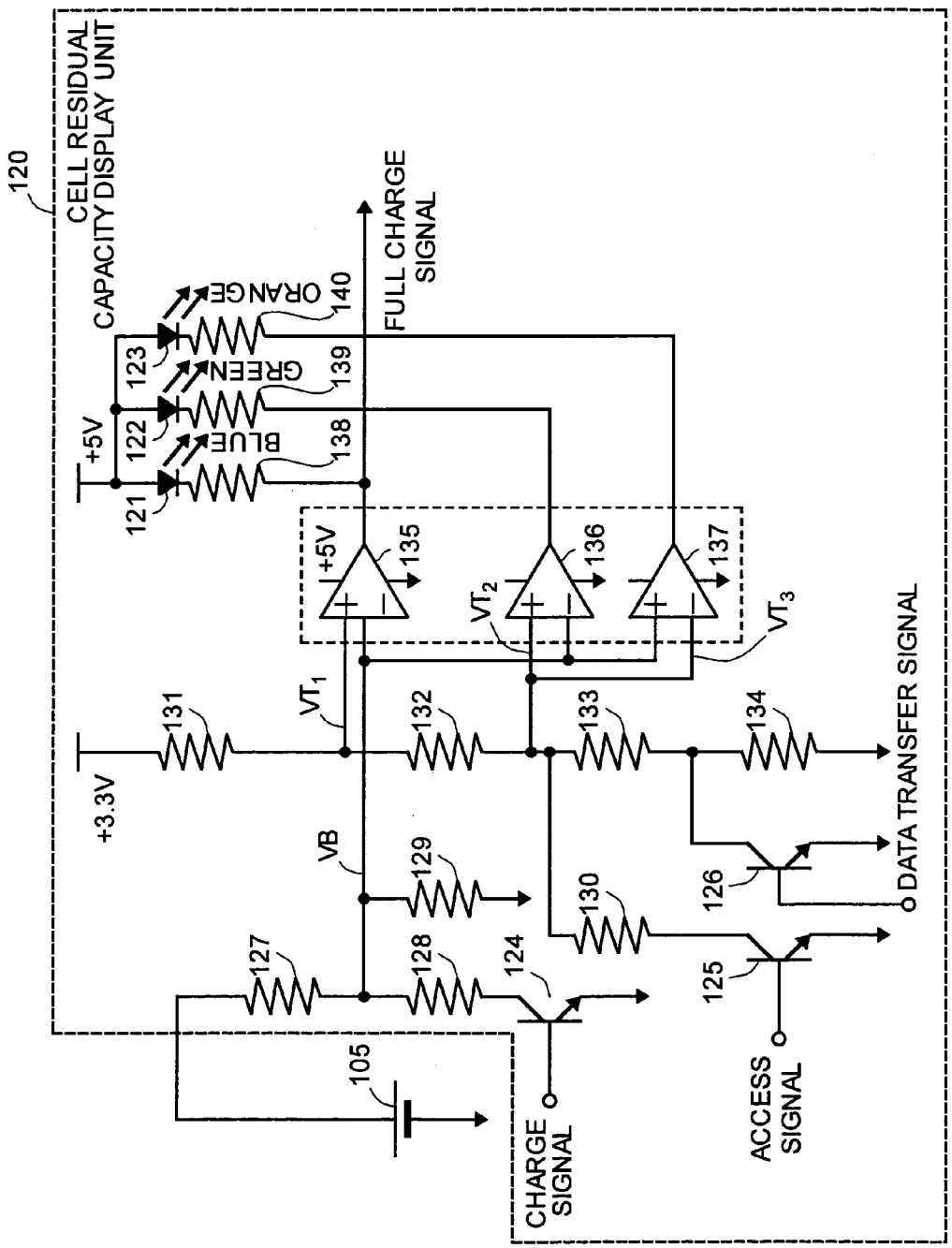
FIG. 2 is a configuration diagram of a battery remaining level display unit 120 shown in FIG. 1.

FIG. 2 is a configuration diagram of the battery remaining level display unit 120 shown in FIG. 1. In the drawing, a blue LED 121, a green LED 122, and an orange LED 123 respectively display battery remaining level of the secondary battery 105 of the bus power device 100 in the following three operation statuses (1) to (3), using respective (red, green, and orange) colors:

(1) Charge the secondary battery 105 (see FIG. 1) (hereinafter, "a charge status");
(2) Access the hard disk 103 (hereinafter, "an access status"); and
(3) The USB/ATA converter 101 transfers data (hereinafter, "a data transfer status").

A switching element 124, a switching element 125, and a switching element 126 are provided in parallel corresponding to the blue LED 121, the green LED 122, and the orange LED 123 respectively.

The switching element 124 is on/off controlled based on a charge signal which indicates that the bus power device 100 is in the charge status (1), and is turned on when the charge controller 114 (see FIG. 1) inputs the charge signal.

The switching element 125 is on/off controlled based on an access signal which indicates that the bus power device 100 is in the access status (2), and is turned on when the ATA interface 102 (see FIG. 1) inputs the access signal.

The switching element 126 is on/off controlled based on a data transfer signal which indicates that the bus power device 100 is in the data transfer status (3), and is turned on when the ATA interface 102 (see FIG. 1) inputs the data transfer signal.

A resistor 127 and a resistor 128 are present between the secondary battery 105 and the switching element 124. The resistor 127 and a resistor 129 are connected to the secondary battery 105. In the drawing, a voltage of the resistor 129 is a battery voltage VB of the secondary battery 105. One end of a resistor 130 is connected to the switching element 125.

A resistor 131, a resistor 132, a resistor 133, and a resistor 134 are connected in series, and they are voltage divider resistors that generate threshold voltages at three stages of a threshold voltage $VT_1$, a threshold voltage $VT_2$ (<the threshold voltage $VT_1$), and a threshold voltage $VT_3$ (<the threshold voltage $VT_2$: when the switching element 126 is on) which are compared with the battery voltage VB respectively. The resistors 131, 132, 133, and 134 are applied with a voltage of 3.3 V respectively.

A comparator 135 compares the battery voltage VB with the threshold voltage $VT_1$. When the battery voltage VB exceeds the threshold voltage $VT_1$, the comparator 135 turns on the blue LED 121 through a resistor 138, and outputs a full charge signal to the hard disk power source switch 109 (see FIG. 1).

A comparator 136 compares the battery voltage VB with the threshold voltage $VT_2$. When the battery voltage VB exceeds the threshold voltage $VT_2$, the comparator 136 turns on the green LED 122 through a resistor 139. A comparator 137 compares the battery voltage VB with the threshold voltage $VT_3$. When the battery voltage VB is lower than the threshold voltage $VT_3$, the comparator 137 turns on the orange LED 123 through a resistor 140.

Figure 3:
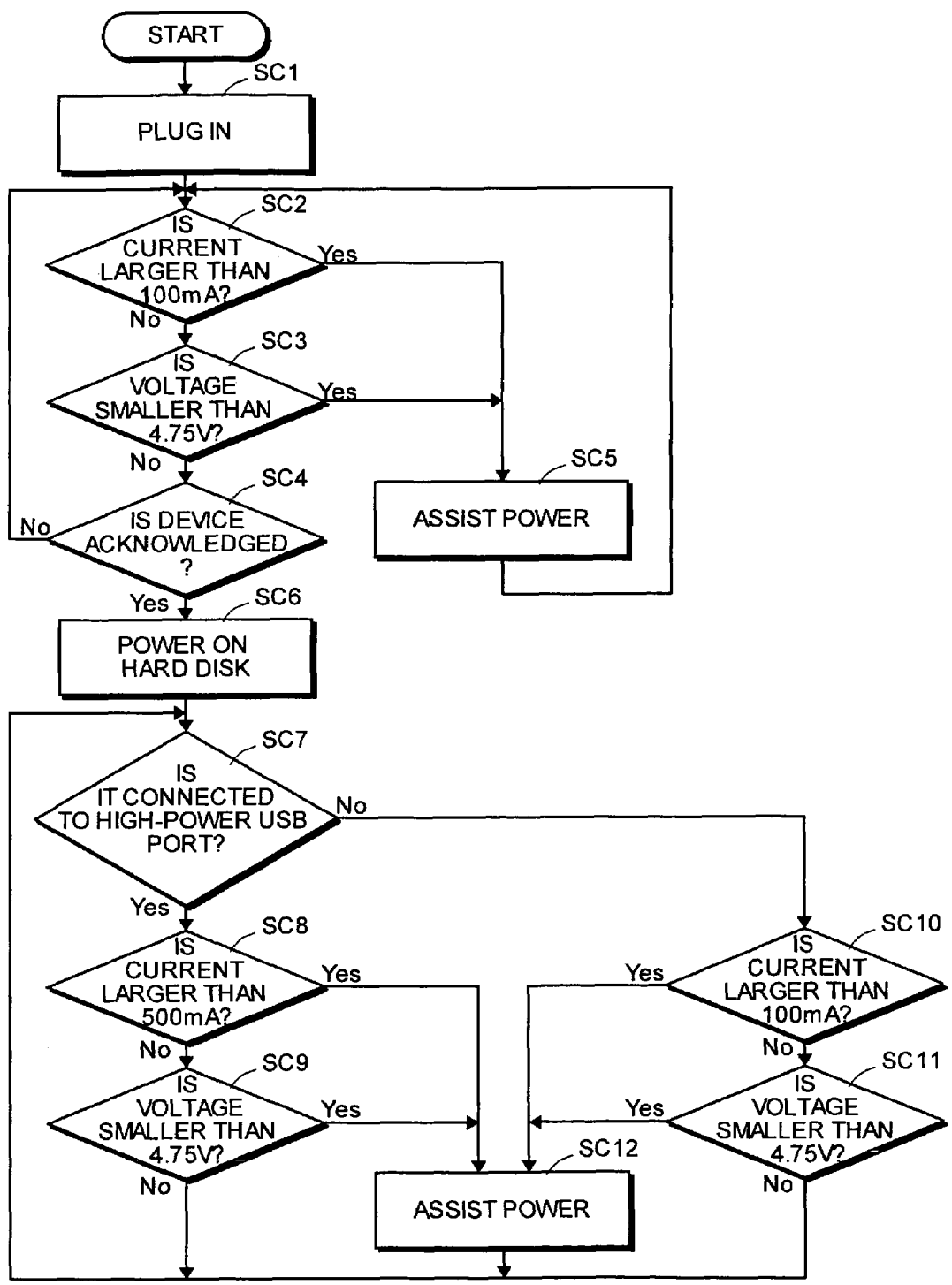
FIG. 3 is a flowchart for explaining a power assist operation by a bus power device 100 shown in FIG. 1.
Figure 4:
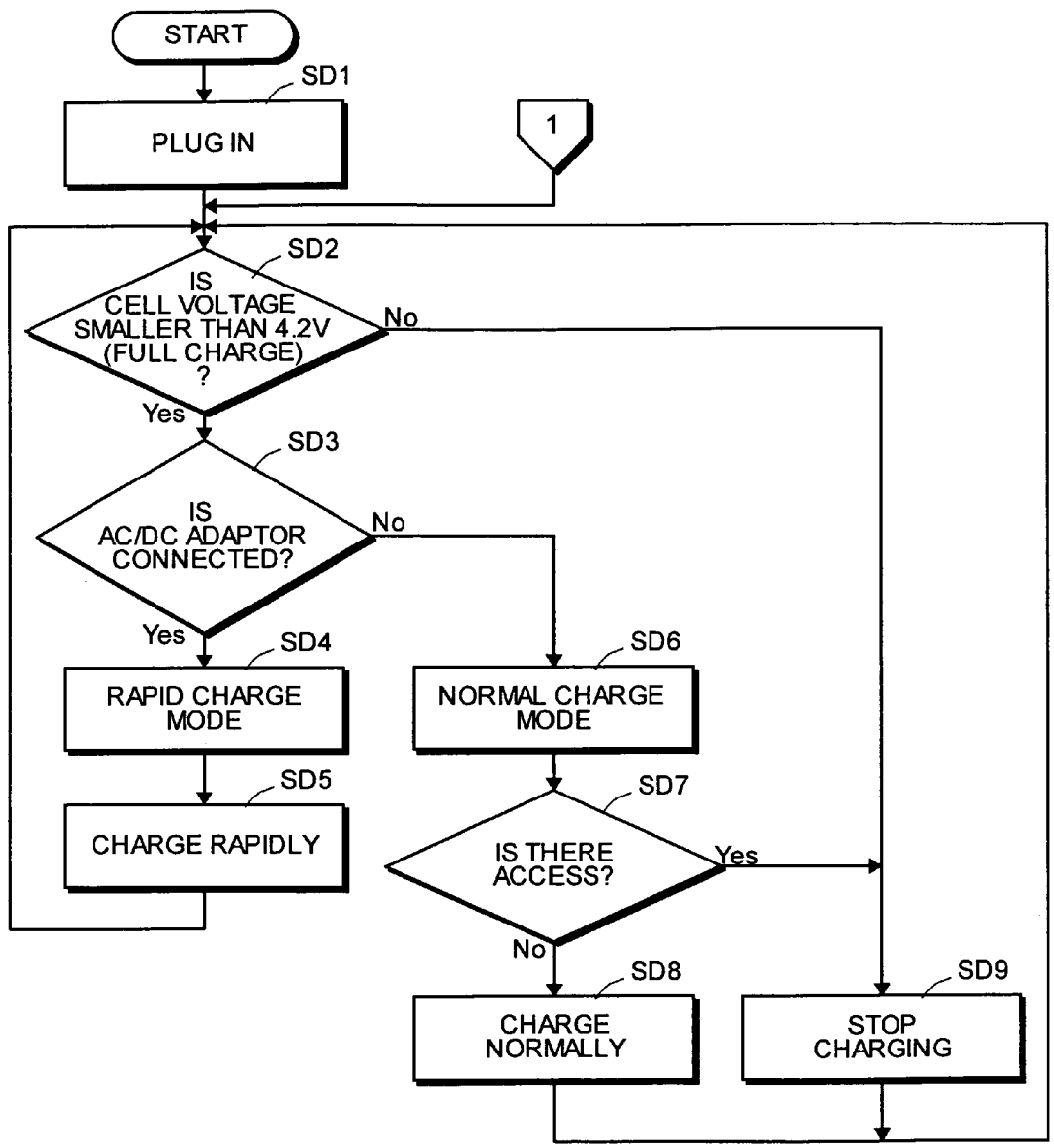
FIG. 4 is a flowchart for explaining a charge operation by the bus power device 100 shown in FIG. 1.

The operation by the bus power device according to the first embodiment is explained next with reference to flowcharts shown in FIG. 3 and FIG. 4. FIG. 3 is a flowchart for explaining the power assist operation by the bus power device 100 shown in FIG. 1. FIG. 4 is a flowchart for explaining the charge operation by the bus power device 100.

At step SC1 shown in FIG. 3, the USB connector 150 is connected to the high-power USB port 11, and is plugged in. Then, the USB-corresponding device 10 supplies the low power (100 mA/5 V) to each section through the bus power line 151. The current/voltage detector 107 detects the current/voltage of the bus power line 151.

According to the USB interface standard, the high-power USB port 11 supplies the low power (100 mA/5 V) to the bus power device 100 during the period from when the USB connector 150 is plugged into the high-power USB port 11 till when the USB-corresponding device 10 acknowledges the bus power device 100. After the USB-corresponding device 10 acknowledges the bus power device 100, the high-power USB port 11 supplies the high power (500 mA/5 V) to the bus power device 100.

At step SC2, the current/voltage detector 107 determines whether the current that flows through the bus power line 151 exceeds the threshold current (=100 mA). In this case, the current/voltage detector 107 determines "No" as a result.

At step SC3, the current/voltage detector 107 determines whether the voltage of the bus power line 151 is less than the threshold voltage (=4.75 V). In this case, the current/voltage detector 107 determines "No" as a result. At step SC4, the current/voltage detector 107 determines whether the USB-corresponding device 10 acknowledges the bus power device 100. In this case, the current/voltage detector 107 determines "No" as a result.

When the current that flows through the bus power line 151 exceeds the threshold current (=100 mA), the current/voltage detector 107 determines "Yes" at step SC2. At step SC5, the current/voltage detector 107 instructs the power assisting-unit 108 to assist the current.

As a result, the power assisting unit 108 supplies the current from the DC/DC converter 106 (the secondary battery 105) to the bus power line 151. Accordingly, the current/voltage detector 107 detects that the current is smaller by as much as the current from the DC/DC converter 106 (the secondary battery 105). The current becomes smaller than the threshold current (=100 mA).

When the voltage of the bus power line 151 becomes less than the threshold voltage (=4.75 V), the current/voltage detector 107 determines "Yes" at step SC3. At step SC5, the current/voltage detector 107 instructs the power assisting unit 108 to assist the voltage.

As a result, the power assisting unit 108 supplies the voltage from the DC/DC converter 106 (the secondary battery 105) to the bus power line 151. Accordingly, the current/voltage detector 107 detects that the voltage increases due to the voltage from the DC/DC converter 106 (the secondary battery 105). The voltage becomes equal to or higher than the threshold voltage (=4.75 V).

When the USB-corresponding device 10 acknowledges the bus power device 100, the determination at step SC4 becomes "Yes".

As a result, at step SC6, the USB-corresponding device 10 supplies the high power (500 mA/5 V) to each section through the bus power line 151, and the hard disk 103 is powered on.

Specifically, the DC/DC converter 104 supplies a voltage of 3.3 V to the USB/ATA converter 101, so that the USB/ATA converter 101 starts operation. When the USB/ATA converter 101 turns on the hard disk power source switch 109, the bus power line 151 supplies power to the hard disk 103, so that the hard disk 103 starts operation.

At step SC7, the current/voltage detector 107 determines whether the USB connector 150 is connected to the high-power USB port 11. The current/voltage detector 107 determines "Yes" as a result in this case. At step SC8, the current/voltage detector 107 determines whether the current that flows through the bus power line 151 exceeds the threshold current (=500 mA). In this case, the current/voltage detector 107 determines "No" as a result.

At step SC9, the current/voltage detector 107 determines whether the voltage of the bus power line 151 is less than the threshold voltage (=4.75 V). In this case, the current/voltage detector 107 determines "No" as a result. Thereafter, the processing at step SC7 to step SC9 is repeated.

When an inrush current flows through the bus power line 151 due to the initial rotation of the hard disk 103 and also when the current exceeds the threshold current (=500 mA), the current/voltage detector 107 determines "Yes" at step SC8. At step SC12, the current/voltage detector 107 instructs the power assisting unit 108 to assist the current.

As a result, the power assisting unit 108 supplies the current from the DC/DC converter 106 (the secondary battery 105) to the bus power line 151. Accordingly, the current/voltage detector 107 detects that the current is smaller by as much as the current from the DC/DC converter 106 (the secondary battery 105). The current becomes equal to or smaller than the threshold current (=500 mA).

When a voltage drop is large due to a contact resistance or a cable length from the high-power USB port 11 to a subject to be driven (the hard disk 103 or the like), the voltage of the bus power line 151 becomes less than the threshold voltage (=4.75 V). Therefore, the current/voltage detector 107 determines "Yes" at step SC9. At step SC12, the current/voltage detector 107 instructs the power assisting unit 108 to assist the voltage.

As a result, the power assisting unit 108 supplies the voltage from the DC/DC converter 106 (the secondary battery 105) to the bus power line 151. Accordingly, the current/voltage detector 107 detects that the voltage increases due to the voltage from the DC/DC converter 106 (the secondary battery 105). The voltage becomes equal to or higher than the threshold voltage (=4.75 V).

When the USB connector 150 is connected to the low-power USB port 12, the current/voltage detector 107 determines "No" at step SC7. In this case, the USB-corresponding device 10 supplies the low power (100 mA/5 V) to each section through the bus power line 151.

When the USB connector 150 is connected to the low-power USB port 12 and also when the AC/DC adaptor 111 is connected to the DC jack 110, the AC/DC adaptor 111 supplies operation power to the bus power line 151 via the power assisting unit 108.

On the other hand, when the USB connector 150 is connected to the low-power USB port 12 and also when the AC/DC adaptor 111 is not connected to the DC jack 110, operation power is supplied to the bus power line 151 via the DC/DC converter 106 and the power assisting unit 108 based on a discharge from the secondary battery 105.

At step SC10, the current/voltage detector 107 determines whether the current that flows through the bus power line 151 exceeds the threshold current (=100 mA). In this case, the current/voltage detector 107 determines "No" as a result.

At step SC11, the current/voltage detector 107 determines whether the voltage of the bus power line 151 is less than the threshold voltage (=4.75 V). In this case, the current/voltage detector 107 determines "No" as a result. Thereafter, the processing at step SC7, step SC10, and step SC11 is repeated.

When an inrush current flows through the bus power line 151 due to the initial rotation of the hard disk 103 and also when the current exceeds the threshold current (=100 mA), the current/voltage detector 107 determines "Yes" at step SC10. At step SC12, the current/voltage detector 107 instructs the power assisting unit 108 to assist the current in a similar manner to that of the above operation.

When a voltage drop is large due to a contact resistance or a cable length from the low-power USB port 12 to a subject to be driven (the hard disk 103 or the like), the voltage of the bus power line 151 becomes less than the threshold voltage (=4.75 V). Therefore, the current/voltage detector 107 determines "Yes" at step SC11. At step SC12, the current/voltage detector 107 instructs the power assisting unit 108 to assist the voltage in a similar manner to that of the above operation.

The charge operation by the bus power device 100 is explained next with reference to the flowchart shown in FIG. 4. At step SD1 shown in the drawing, the USB connector 150 is connected to the high-power USB port 11 (or the low-power USB port 12) and is plugged in. Then, at step SD2, the charge controller 114 determines whether the battery voltage of the secondary battery 105 is less than 4.2 V (a full charge).

When determined "Yes" at step SD2 is, the charge mode selector 113 determines at step SD3 whether the AC/DC adaptor 111 is connected to the DC jack 110.

When determined "No" at step SD3, the charge mode selector 113 selects the normal charge mode at step SD6. At step SD7, the charge timing selector 112 determines whether the hard disk 103 is accessed, that is, whether a current consumption is large due to the access.

When determine "No" at step SD7, the charge timing selector 112 outputs a charge instruction to the charge controller 114. At step SD8, the charge controller 114 supplies the first charge current to the secondary battery 105 in the normal charge mode selected by the charge mode selector 113, to execute the normal charge. The first charge current is a part of the current that is supplied from the USB-corresponding device 10 to the bus power line 151 and that flows through the bus power line 151.

On the other hand, when determined "Yes" at step SD7, the charge timing selector 112 outputs a charge stop instruction to the charge controller 114. At step SD9, the charge controller 114 stops charging the secondary battery 105.

When the AC/DC adaptor 111 is connected to the DC jack 110, the determination result at step SD3 becomes "Yes". At step SD4, the charge mode selector 113 selects the rapid charge mode. At step SD5, the charge controller 114 supplies the second charge current (>the first charge current) to the secondary battery 105 corresponding to the rapid charge mode, thereby executing the rapid charge. When determined "No" at step SD2, the charge is stopped at step SD9.

The second charge current is a part of the current that is supplied from both the USB-corresponding device 10 and the AC/DC adaptor 111 to the bus power line 151 and that flows through the bus power line 151. The second charge current is larger than the first charge current according to the normal charge. Therefore, based on the rapid charge, the secondary battery 105 can be fully charged in a shorter time than that based on the normal charge.

The battery remaining level display operation by the battery remaining level display unit 120 shown in FIG. 2 is explained next. When the charge controller 114 (see FIG. 1) inputs a charge signal to the switching element 124 in a state that the secondary battery 105 is charged, in FIG. 2, the switching element 124 is turned on, and the resistor 128 is connected in parallel with the resistor 129. Therefore, the battery voltage VB changes.

When the battery voltage VB exceeds the threshold voltage $VT_1$, the comparator 135 turns on the blue LED 121, and outputs a full charge signal indicating that the secondary battery 105 is fully charged, to the hard disk power source switch 109 (see FIG. 1). When the blue LED 121 is turned on, a user acknowledges that the secondary battery 105 is fully charged.

When the ATA interface 102 (see FIG. 1) inputs an access signal to the switching element 125 in the access status, the switching element 125 is turned on, and the resistor 130 is connected in parallel with the resistor 133 and the resistor 134. The threshold voltage $VT_2$ is lower than the threshold voltage $VT_1$. When the battery voltage VB exceeds the threshold voltage $VT_2$, the comparator 136 turns on the green LED 122.

When the ATA interface 102 (see FIG. 1) inputs a data transfer signal to the switching element 126 in the data transfer status, the switching element 126 is turned on, and the resistor 134 is short-circuited. When the battery voltage VB becomes lower than the threshold voltage $VT_3$, the comparator 137 turns on the orange LED 123.

As explained above, according to the first embodiment, the current/voltage detector 107 detects the current/voltage supplied from the USB-corresponding device 10 to the bus power line via the high-power USB port 11 (or the low-power USB port 12) and the USB connector 150. The power assisting unit 108 assists the current to the bus power line 151 based on a result of the comparison between the detected current and the threshold current. The power assisting unit 108 also assists a voltage as much as the deficient amount to the bus power line 151 based on a result of the comparison between the detected voltage and the threshold voltage. Therefore, overload of the USB-corresponding device 10 due to a current increase or an inoperative state due to a voltage drop can be avoided.

According to the first embodiment, when the current/voltage detector 107 detects that the voltage is less than a threshold voltage, the power assisting unit 108 assists voltage to the bus power line 151 to compensate for a voltage drop from the USB-corresponding device 10 to the bus power line 151. Therefore, an inoperative state due to the voltage drop attributable to a cable length or a contact resistance can be avoided.

According to the first embodiment, when the AC/DC adaptor 111 as a separate power source is not connected to the bus power line 151, the first charge current is charged to the secondary battery 105 in the normal charge mode. When the AC/DC adaptor 111 is connected to the bus power line 151, the second charge current larger than the first charge current is rapidly charged to the secondary battery 105. Therefore, needs for a rapid charge to complete charging in a short time can be satisfied.

According to the first embodiment, when the USB connector 150 is connected to the low-power USB port 12 and also when the AC/DC adaptor 111 is not connected to the DC jack 110, the secondary battery 105 supplies power to each section as a main power source through the bus power line 151. Therefore, bus power device 100 can be operated by the low-power USB port 12 without the AC/DC adaptor 111.

According to the first embodiment, as shown in FIG. 2, the threshold voltage $VT_1$, the threshold voltage $VT_2$, and the threshold voltage $VT_3$ are set at stages according to the operation statuses (the charge status, the access status, and the data transfer status) of each section. Based on a result of comparison between the battery voltage VB of the secondary battery 105 and the threshold voltage, battery remaining level corresponding to the operation status is displayed in the blue LED 121, the green LED 122, and the orange LED 123. Therefore, battery remaining level corresponding to the operation status can be understood.

In the first embodiment, a configuration example of rapidly charging the secondary battery 105 has been explained. When a more rapid charge is necessary, a bus power device can be configured to carry out a compulsory charge to the secondary battery 105 with priority by stopping power supply to each section or stopping its functions. An example of this configuration is explained as a second embodiment of the present invention.

Figure 5:
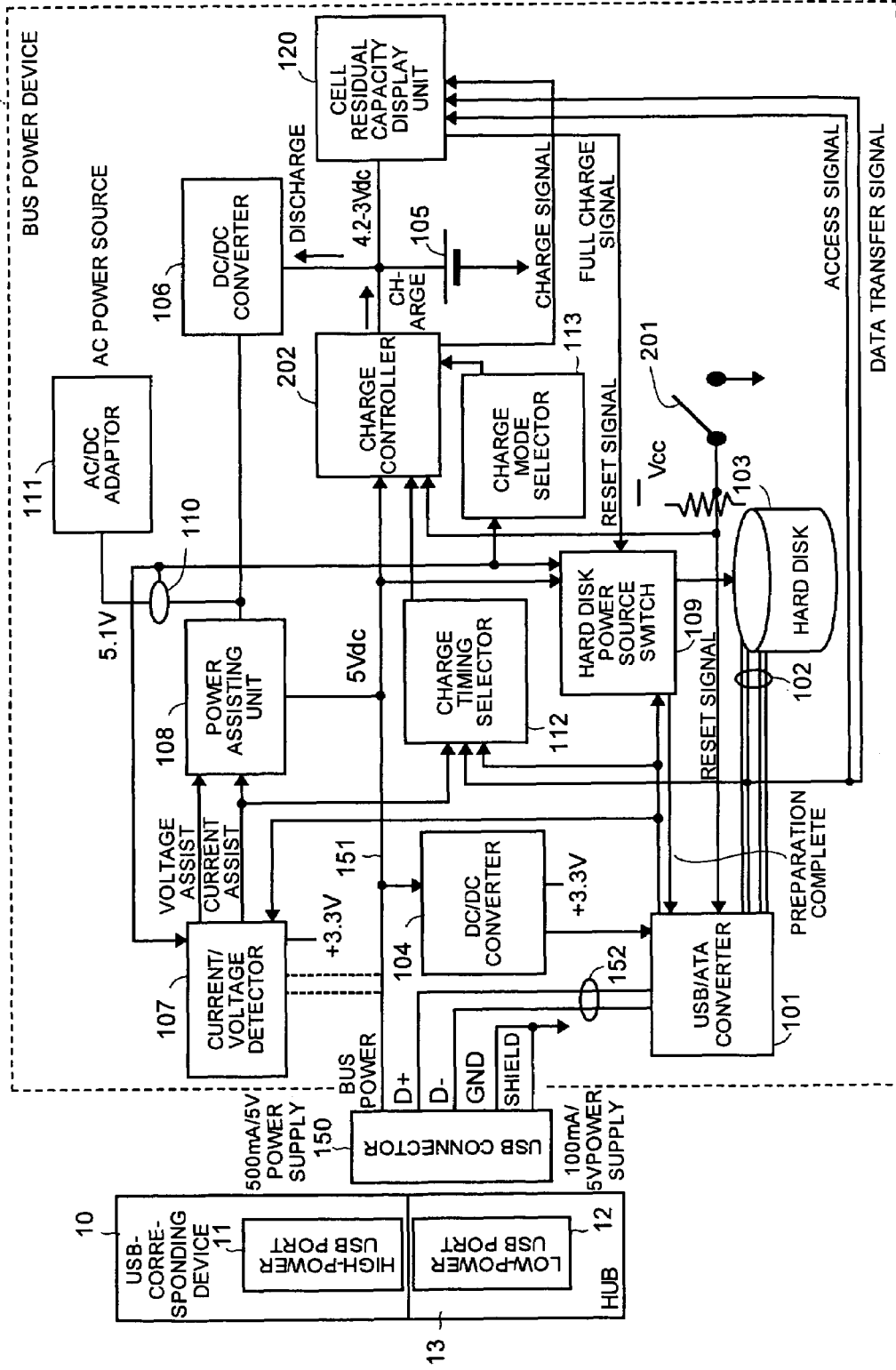
FIG. 5 is a block diagram of a configuration of a bus power device according to a second embodiment of the present invention.

FIG. 5 is a block diagram of a configuration of a bus power device according to the second embodiment. In the drawing, like reference numerals as those in FIG. 1 designate like parts, and their explanation is omitted. A bus power device 200 shown in the drawing has a compulsory charge switch 201 additionally, and a charge controller 202 instead of the charge controller 114 shown in FIG. 1.

The compulsory charge switch 201 is operated by a user to carry out the compulsory charge. The charge controller 202 has the function of carrying out the normal charge and the rapid charge that the charge controller 114 (see FIG. 1) has, and a function of carrying out the compulsory charge when the compulsory charge switch 201 is turned on.

Figure 6:
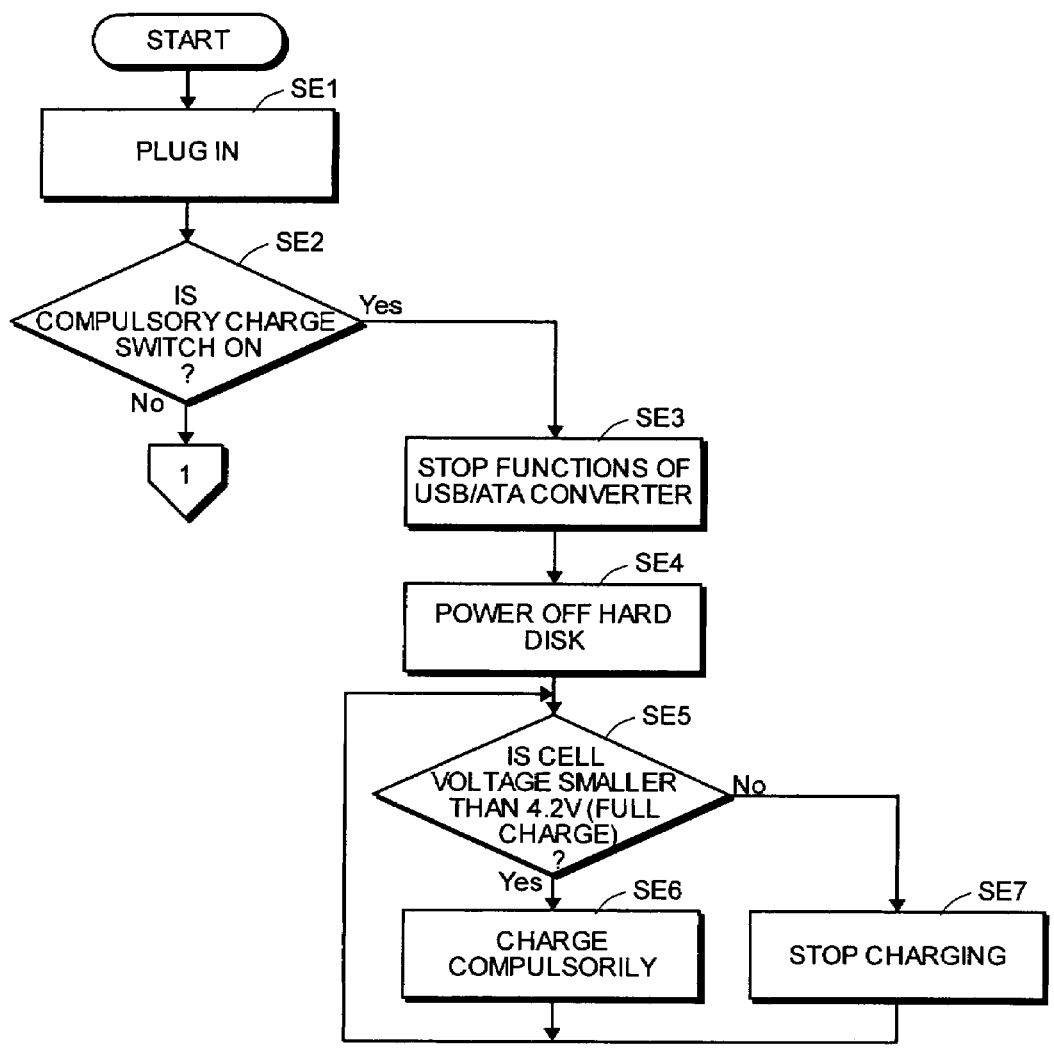
FIG. 6 is a flowchart for explaining a charge operation by a bus power device 200 shown in FIG. 5.
Figure 7:
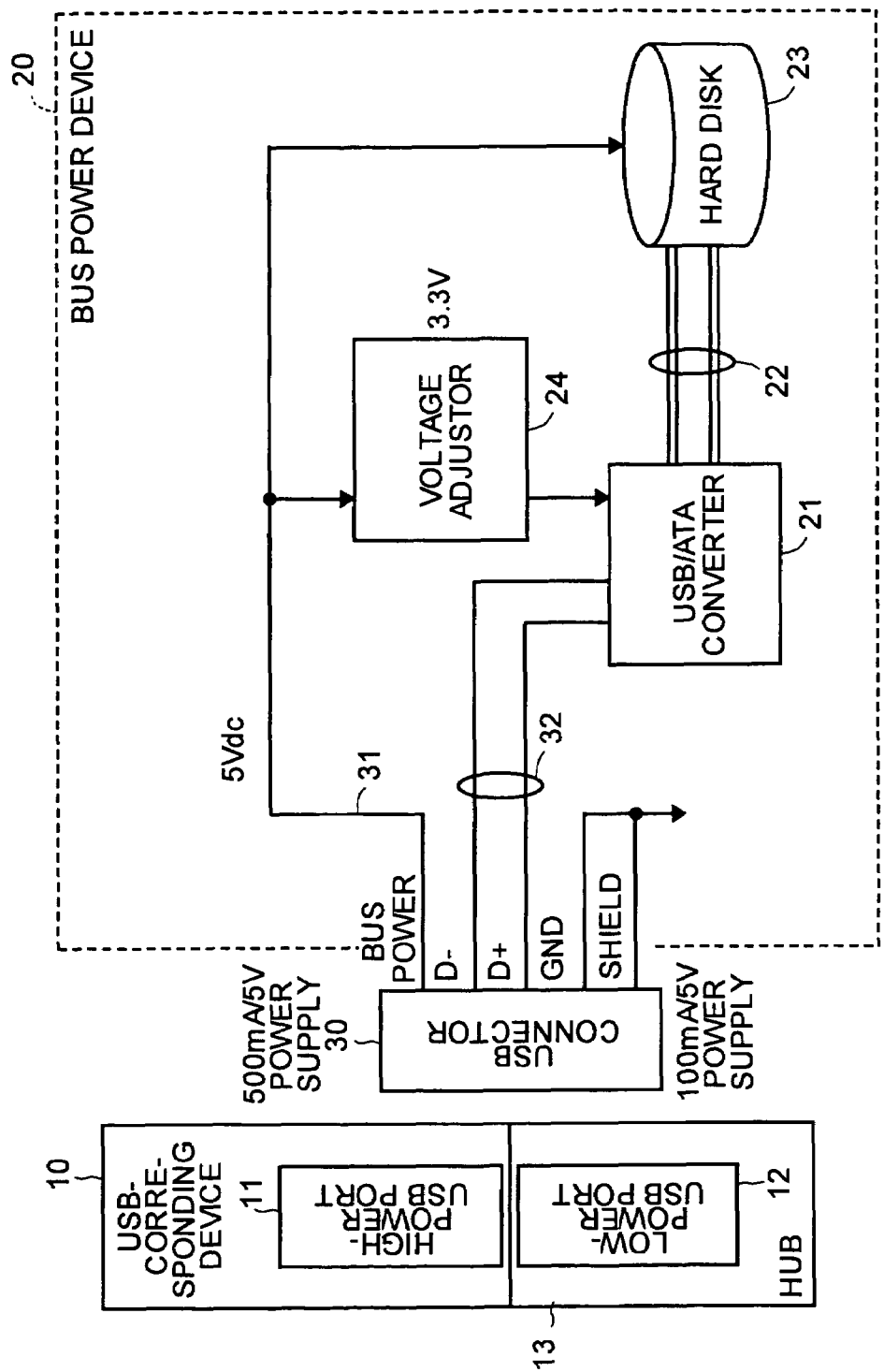
FIG. 7 is a block diagram of a configuration of a conventional bus power device 20.
Figure 8:
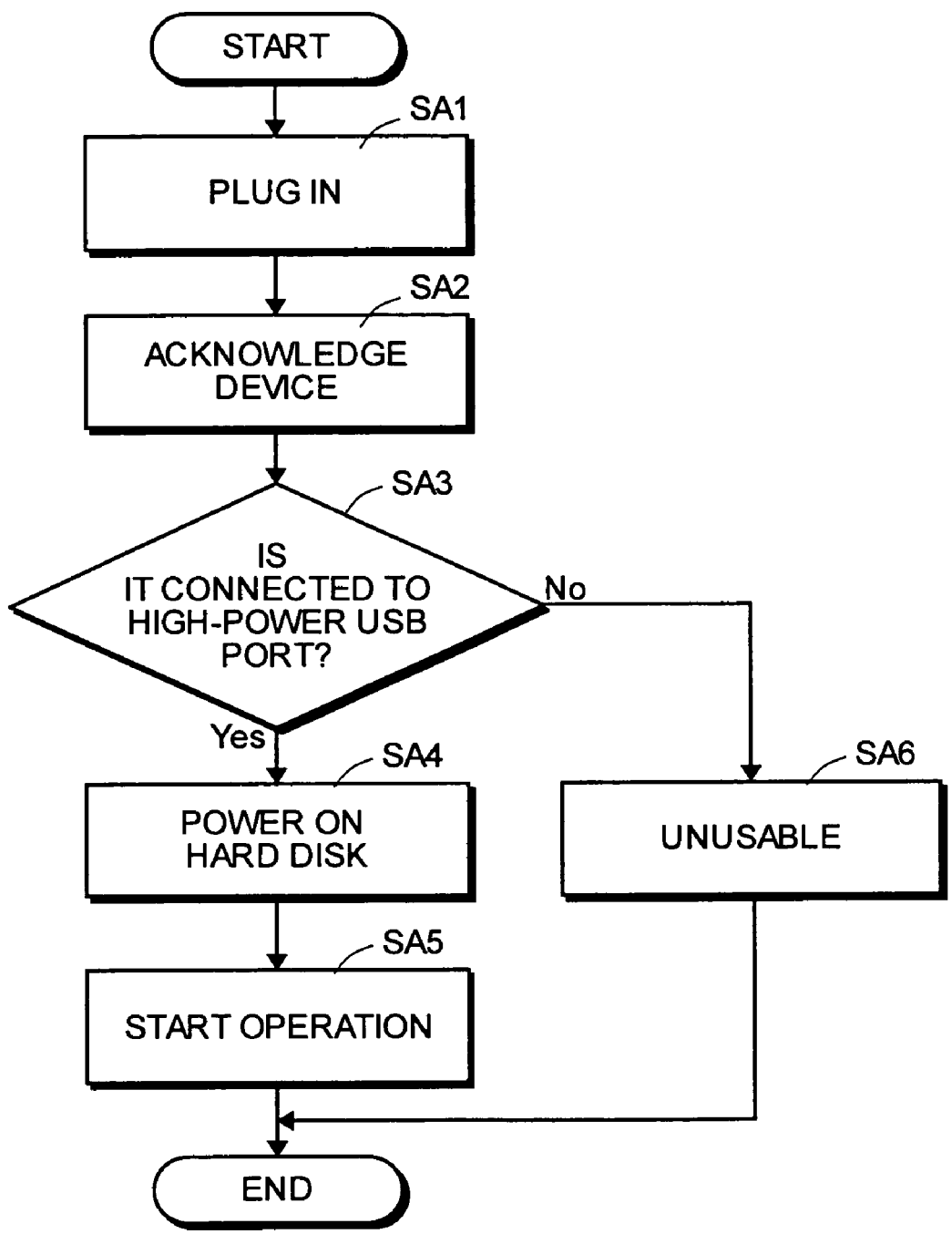
FIG. 8 is a flowchart for explaining the operation by the bus power device 20 shown in FIG. 7.

The charge operation by the bus power device 200 shown in FIG. 5 is explained with reference to a flowchart shown in FIG. 6. At step SE1 shown in the drawing, the USB connector 150 is connected to the high-power USB port 11, and is plugged in.

At step SE2, the charge controller 202 determines whether the compulsory charge switch 201 is on. When the determination result is "No", the normal charge or the rapid charge is carried out to the secondary battery 105 at step SD2 and subsequent steps in FIG. 4.

When the compulsory charge switch 201 is on, the charge controller 202 determines "Yes" at step SE2. At step SE3, the USB/ATA converter 101 stops the convert function since a reset signal is input following the turning-on of the compulsory charge switch 201. As a result, the USB/ATA converter 101 lowers power consumption.

At step SE4, the USB/ATA converter 101 outputs an off signal to the hard disk power source switch 109. As a result, the hard disk power source switch 109 is turned off, and stops supplying power to the hard disk 103.

At step SE5, the charge controller 202 determines whether the battery voltage of the secondary battery 105 is less than 4.2 V (full charge), and, in this case, determines "Yes" as a result.

At step SE6, the charge controller 202 supplies a third charge current to the secondary battery 105 corresponding to a compulsory charge mode from the compulsory charge switch 201, thereby executing the compulsory charge. The USB-corresponding device 10 (the AC/DC adaptor 111) supplies the third charge current to the bus power line 151 so that this current flows through the bus power line 151.

The power saved by the USB/ATA converter 101 and the power not supplied to the hard disk 103 is devoted to the compulsory charge to the secondary battery 105 as the third charge current. Therefore, among the normal charge and the rapid charge according to the first embodiment, and the above compulsory charge, the compulsory charge fully charges the secondary battery 105 in a shortest time.

When determined "Yes" at step SE5 due to the compulsory charge, the charge controller 202 stops charging the secondary battery 105 at step SE7.

As explained above, according to the second embodiment, compulsory charge is instructed by stopping (or lowering) power supply to the load (the hard disk 103, the USB/ATA converter 101, and the like) that is connected to the bus power line 151, thereby compulsorily charging the third charge current larger than the second charge current to the secondary battery 105. Therefore, needs for a compulsory charge to complete charging in a shorter time can be satisfied.

While the first and the second embodiments of the present invention are described in detail with reference to the accompanying drawings, specific examples of the configuration are not limited thereto, and various design changes within the scope of the appended claims are also included in the invention.

As explained above, according to the present invention, current/voltage supplied from a higher device to the bus power line via the port and the connector is detected. A current to the bus power line is assisted based on a result of comparison between the detected current and the threshold current. Voltage as much as the deficient amount is assisted to the bus power line based on a result of comparison between the detected voltage and the threshold voltage. Therefore, there is an effect that overload of the higher device due to a current increase or an inoperative state due to a voltage drop can be avoided.

Furthermore, according to the present invention, when the detected voltage is less than the threshold voltage, voltage to the bus power line is assisted to compensate for a voltage drop from the higher device to the bus power line. Therefore, there is an effect that an inoperative state due to the voltage drop attributable to a cable length or a contact resistance can be avoided.

Moreover, according to the present invention, when a separate power source is not connected to the bus power line, the first charge current is normally charged to the secondary battery. When a separate power source is connected to the bus power line, the second charge current larger than the first charge current is rapidly charged to the secondary battery. Therefore, there is an effect that needs for a rapid charge to complete charging in a short time can be satisfied.

Furthermore, according to the present invention, compulsory charge is instructed by stopping power supply to the load connected to the bus power line, thereby compulsorily charging the third charge current larger than the second charge current to the secondary battery. Therefore, there is an effect that needs for a compulsory charge to complete charging in a shorter time can be satisfied.

Moreover, according to the present invention, threshold voltages are set at stages according to the operation statuses of each section. Based on a result of comparison between the battery voltage of the secondary battery and the threshold voltage, battery remaining level corresponding to the operation status is displayed. Therefore, there is an effect that battery remaining level corresponding to the operation status can be understood.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A bus power device comprising:
   a connector that is connected to a port of a host apparatus compliant with a predetermined interface standard;
   a current/voltage detecting unit that detects a current/voltage supplied from the host apparatus to a bus power line via the port and the connector;
   a power assisting unit that assists a current to the bus power line based on a result of comparison between the current detected by the current/voltage detecting unit and a threshold current, and assists a voltage to the bus power line by an amount of shortfalls in the voltage based on a result of comparison between the voltage detected by the current/voltage detecting unit and a threshold voltage;
   a secondary battery used by the power assisting unit as a power source to assist the current/voltage; and
   a charge controller that normally charges, when a separate power source is not connected to the bus power line, the secondary battery with a first charge current, and rapidly charges, when the separate power source is connected to the bus power line, the secondary battery with a second charge current larger than the first charge current,
   wherein the port is a low-power port that outputs low power, and
   when the connector is connected to the low-power port, and when the separate power source is not connected to the bus power line, the secondary battery supplies power to each section via the bus power line as a main power source.

2. The bus power device according to claim 1, wherein when the current detected exceeds the threshold current, the power assisting unit assists the current to the bus power line by an amount of an excess in the current.

3. The bus power device according to claim 1, wherein when the voltage detected is lower than the threshold voltage, the power assisting unit assists the voltage to the bus power line to compensate for a voltage drop from the host apparatus to the bus power line.

4. The bus power device according to claim 1, further comprising a forced-charge instructing unit that instructs a forced charge by stopping a power supply to a load connected to the bus power line, wherein when the forced charge is instructed, the charge controller forcibly charges the secondary battery with a third charge current larger than the second charge current.

5. The bus power device according to claim 1, further comprising:
   a threshold-voltage setting unit that sets a threshold voltage in stages corresponding to an operation status of each section; and
   a battery-remaining-level display unit that displays a battery remaining level corresponding to the operation status based on a result of comparison between a battery voltage of the secondary battery and the threshold voltage.

6. The bus power device according to claim 5, wherein the operation status includes a charge status of the secondary battery, an access status to a hard disk connected to the bus power line, and a data transfer status.

7. A power-source control method for a bus power device having a connector that is connected to a port of a host apparatus compliant with a predetermined interface standard, the power-source control method comprising:
   detecting a current/voltage supplied from the host apparatus to a bus power line via the port and the connector;
   a power assisting including
   assisting a current to the bus power line based on a result of comparison between the current detected by the current/voltage detecting unit and a threshold current; and
   assisting a voltage to the bus power line by an amount of shortfalls in the voltage based on a result of comparison between the voltage detected by the current/voltage detecting unit and a threshold voltage;
   a charge controlling including
   charging normally, when a separate power source is not connected to the bus power line, the secondary battery with a first charge current; and
   charging rapidly, when the separate power source is connected to the bus power line, the secondary battery with a second charge current larger than the first charge current,
   wherein the port is a low-power port that outputs low power, and
   when the connector is connected to the low-power port, and when the separate power source is not connected to the bus power line, the secondary battery supplies power to each section via the bus power line as a main power source.

8. The power-source control method according to claim 7, wherein when the current detected exceeds the threshold current, the power assisting includes assisting the current to the bus power line by an amount of an excess in the current.

9. The power-source control method according to claim 7, wherein when the voltage detected is lower than the threshold voltage, the power assisting includes assisting the voltage to the bus power line to compensate for a voltage drop from the host apparatus to the bus power line.

10. The power-source control method according to claim 7, further comprising instructing a forced charge by stopping a power supply to a load connected to the bus power line, wherein
   when the forced charge is instructed, the charge controlling includes charging forcibly the secondary battery with a third charge current larger than the second charge current.

11. The power-source control method according to claim 7, further comprising:
   setting a threshold voltage in stages corresponding to an operation status of each section; and
   displaying a battery remaining level corresponding to the operation status based on a result of comparison between a battery voltage of the secondary battery and the threshold voltage.

12. The power-source control method according to claim 11, wherein the operation status includes a charge status of the secondary battery, an access status to a hard disk connected to the bus power line, and a data transfer status.

13. A bus power device comprising:
   a connector that is connected to a port of a host apparatus compliant with a predetermined interface standard;
   a current/voltage detecting unit that detects a current/voltage supplied from the host apparatus to a bus power line via the connector:
   a secondary battery that is to be charged and discharged;
   a power assisting unit that supplies power to the bus power line by an amount of shortfalls in power according to the detected current/voltage by using the secondary battery as a main power source, when a separate power source is not connected to the bus power line; and
   a charge controller that normally charges the secondary battery, when the shortfalls in power have not occurred according to the detected current/voltage and the separate power source is not connected to the bus power line, and that rapidly charges the secondary battery, when the shortfalls in power have not occurred according to the detected current/voltage and the separate power source is connected to the bus power line.

14. A power-source control method for a bus power device having a connector that is connected to a port of a host apparatus compliant with a predetermined interface standard and a secondary battery that is to be charged and discharged, the method comprising:
   detecting a current/voltage supplied from the host apparatus to a bus power line via the connector;
   supplying power to the bus power line by an amount of shortfalls in power according to the detected current/voltage by using the secondary battery as a main power source, when a separate power source is not connected to the bus power line;
   normally charging the secondary battery, when the shortfalls in power have not occurred according to the detected current/voltage and the separate power source is not connected to the bus power line; and
   rapidly charging the secondary battery, when the shortfalls in power have not occurred according to the detected current/voltage and the separate power source is connected to the bus power line.

15. A bus power device comprising:
   a connector that is connected to a port of a host apparatus compliant with a predetermined interface standard;
   a current/voltage detecting unit that detects a current/voltage supplied from the host apparatus to a bus power line via the port and the connector;
   a power assisting unit that assists a current to the bus power line based on a result of comparison between the current detected by the current/voltage detecting unit and a threshold current, and assists a voltage to the bus power line by an amount of shortfalls in the voltage based on a result of comparison between the voltage detected by the current/voltage detecting unit and a threshold voltage;
   a secondary battery used by the power assisting unit as a power source to assist the current/voltage;
   a charge controller that normally charges, when a separate power source is not connected to the bus power line, the secondary battery with a first charge current, and rapidly charges, when the separate power source is connected to the bus power line, the secondary battery with a second charge current larger than the first charge current; and a forced-charge instructing unit that instructs a forced charge by stopping a power supply to a load connected to the bus power line, wherein when the forced charge is instructed, the charge controller forcibly charges the secondary baff ery with a third charge current larger than the second charge current.

16. A bus power device comprising:

a connector that is connected to a port of a host apparatus compliant with a predetermined interface standard;

a current/voltage detecting unit that detects a current/voltage supplied from the host apparatus to a bus power line via the port and the connector;

a power assisting unit that assists a current to the bus power line based on a result of comparison between the current detected by the current/voltage detecting unit and a threshold current, and assists a voltage to the bus power line by an amount of shortfalls in the voltage based on a result of comparison between the voltage detected by the current/voltage detecting unit and a threshold voltage;

a secondary baffery used by the power assisting unit as a power source to assist the current/voltage;

a charge controller that normally charges, when a separate power source is not connected to the bus power line, the secondary battery with a first charge current, and rapidly charges, when the separate power source is connected to the bus power line, the secondary battery with a second charge current larger than the first charge current;

a threshold-voltage setting unit that sets a threshold voltage in stages corresponding to an operation status of each section; and a battery-remaining-level display unit that displays a battery remaining level corresponding to the operation status based on a result of comparison between a battery voltage of the secondary battery and the threshold voltage.

17. A power-source control method for a bus power device having a connector that is connected to a port of a host apparatus compliant with a predetermined interface standard, the power-source control method comprising:

detecting a current/voltage supplied from the host apparatus to a bus power line via the port and the connector;

a power assisting including assisting a current to the bus power line based on a result of comparison between the current detected by the current/voltage detecting unit and a threshold current; and assisting a voltage to the bus power line by an amount of shortfalls in the voltage based on a result of comparison between the voltage detected by the current/voltage detecting unit and a threshold voltage;

instructing a forced charge by stopping a power supply to a load connected to the bus power line, a charge controlling including charging normally, when a separate power source is not connected to the bus power line, the secondary battery with a first charge current;

charging rapidly, when the separate power source is connected to the bus power line, the secondary battery with a second charge current larger than the first charge current; and charging forcibly, when the forced charge is instructed, the secondary batterywith a third charge current larger than the second charge current.

18. A power-source control method for a bus power device having a connector that is connected to a port of a host apparatus compliant with a predetermined interface standard, the power-source control method comprising:

detecting a current/voltage supplied from the host apparatus to a bus power line via the port and the connector;

a power assisting including assisting a current to the bus power line based on a result of comparison between the current detected by the current/voltage detecting unit and a threshold current; and assisting a voltage to the bus power line by an amount of shortfalls in the voltage based on a result of comparison between the voltage detected by the current/voltage detecting unit and a threshold voltage;

a charge controlling including charging normally, when a separate power source is not connected to the bus power line, the secondary battery-with a first charge current; and charging rapidly, when the separate power source is connected to the bus power line, the secondary battery with a second charge current larger than the first charge current;

setting a threshold voltage in stages corresponding to an operation status of each section; and displaying a battery remaining level corresponding to the operation status based on a result of comparison between a battery voltage of the secondary battery and the threshold voltage.

* * * * *

UNITED STATES PATENT AND TRADEMARK OFFICE
CERTIFICATE OF CORRECTION

PATENT NO. : 7,421,594 B2 Page 1 of 1
APPLICATION NO. : 11/023298
DATED : September 2, 2008
INVENTOR(S) : Kenji Nakajima It is certified that error appears in the above-identified patent and that said Letters Patent is hereby corrected as shown below:

In the Claims:

Col. 18, line 16, delete "batterywith" and insert --battery with--.

Col. 18, line 34, delete "battery-with" and insert --battery with--.

Signed and Sealed this

Third Day of February, 2009

JOHN DOLL
*Acting Director of the United States Patent and Trademark Office*